United States Patent [19]

Monat

[11] Patent Number: 4,556,904

[45] Date of Patent: Dec. 3, 1985

[54] TELETEXT SYSTEM HAVING USER PROMPT COMMANDS

[75] Inventor: Robert A. Monat, Indianapolis, Ind.

[73] Assignee: RCA Corporation, Princeton, N.J.

[21] Appl. No.: 472,417

[22] Filed: Mar. 4, 1983

[51] Int. Cl.[4] .............................................. H04N 7/04
[52] U.S. Cl. ..................................................... 358/147
[58] Field of Search ................ 358/147, 142; 340/712, 340/365 VL; 364/522

[56] References Cited

U.S. PATENT DOCUMENTS

| 3,757,037 | 9/1973 | Bialek | 340/712 |
| 3,879,722 | 4/1975 | Knowlton | 340/705 |
| 4,288,809 | 9/1981 | Yabe | 358/147 |
| 4,439,761 | 3/1984 | Fleming et al. | 358/147 |

FOREIGN PATENT DOCUMENTS 57-59223  4/1982  Japan .................................... 340/365

Primary Examiner—John C. Martin
Assistant Examiner—David E. Harvey
Attorney, Agent, or Firm—Eugene M. Whitacre; Joseph J. Laks; Sammy S. Henig

[57] ABSTRACT

Special prompt character identifying control codes are inserted in teletext data for transmission to a teletext equipped receiver. The prompt character identifying codes are detected in the receiver and applied to a symbol converter which alters the prompt characters displayed on the receiver CRT to assure that all prompt characters displayed conform to character symbols actually available on the users teletext keyboard thereby avoiding user confusion as to the particular key-strokes required to access material identified in the teletext menu.

5 Claims, 3 Drawing Figures

TELETEXT SYSTEM HAVING USER PROMPT COMMANDS

FIELD OF THE INVENTION

This invention relates to teletext systems generally and particularly to teletext systems in which the transmitted teletext code may include special symbols or control characters indentifying user prompts.

BACKGROUND OF THE INVENTION

Teletext systems are under consideration for transmitting textual materials to users having television receivers equipped with memories and decoders which capture the teletext information and display the data in character or graphical form on the screen of the associated television receiver. In selecting the data to be displayed it has been proposed to transmit so called "menus" of information available in the teletext system to the user. A menu may include a listing of available pages or topics within the teletext system which the user may access by entering numbers or symbols on his keyboard identified in the text of the menu as being the location of the material. It will be highly desirable if all keyboards contain keys identified by symbols which match the symbols which may be used in identifying the location of information in the teletext menu. The choice of the users' keyboard symbols, is a matter upon which different manufacturers may not agree. Some manufacturers may include keyboards with symbols which exactly match the symbols used to identify material in the teletext menus, whereas other manufacturers may elect to manufacture keyboards having a fewer number of keys, for example, or having different symbols than those actually used in the transmission of teletext to identify the menu items. This in turn can lead to user confusion about which symbols he might key or use to select desired information if the symbols do not exactly match what is transmitted.

SUMMARY OF THE INVENTION

It is an object of the present invention to minimize the possibility of user confusion with regard to selection of particular menu items in a teletext transmission in cases where, for example, the symbols used to represent the menu item do not match the symbols on the users' keyboard.

The present invention resides in part in recognition of the need for transmission of a special control character along with the symbols of the teletext transmission which represent user prompts which direct the user of the teletext receiver to make particular keyboard entries on his system.

The invention resides in a further part in utilizing the special prompt character identifying control codes of the teletext transmission to facilitate a prompt character symbol conversion within the users' receiver to assure that all transmission of the prompt characters displayed on the users' receiver correspond to characters that are actually available on the users' keyboard.

A method of encoding a teletext signal in accordance with the invention comprises identifying those characters of a teletext signal which correspond to user prompts of the displayed teletext material and inserting adjacent to each symbol or set of symbols representative of user prompts a control character prefix or suffix identifying that symbol as being a user prompting symbol.

A teletext receiver for receiving teletext signals encoded as described and embodying the invention includes a teletext receiving means for receiving the coded teletext signals and a first memory means coupled to the teletext signal receiving means for storing in encoded form signals representative of prompting and nonprompting signals to be displayed and signals representative of associated control functions not intended for display. A signal separating means coupled to the first memory means separates the signals representative of symbols to be displayed from the signals representative of control functions. A detector means coupled to the signal separating means generates a control signal representative of a prompting signal to be displayed. A controllable code conversion means coupled to the signal separating means and to the detector means converts the coded signals representative of prompting signals to be displayed into coded signals representative of other symbols under the control of the control signal and passes unchanged those coded signals representative of nonprompting signals. The other symbols to which conversion is made are symbols identifying the function keys of the remote control with which the receiver is associated. A coded symbol-to-pixel conversion means coupled to the controllable code conversion means receives the coded signals to be displayed and generates pixel intensity information therefrom. A second memory means coupled to the coded symbol to pixel conversion means stores the pixel intensity information and a display means coupled to the second memory means displays the nonprompting symbols and the converted prompting symbols corresponding with symbols identifying the function keys of the remote control.

DETAILED DESCRIPTION

Figure 1:
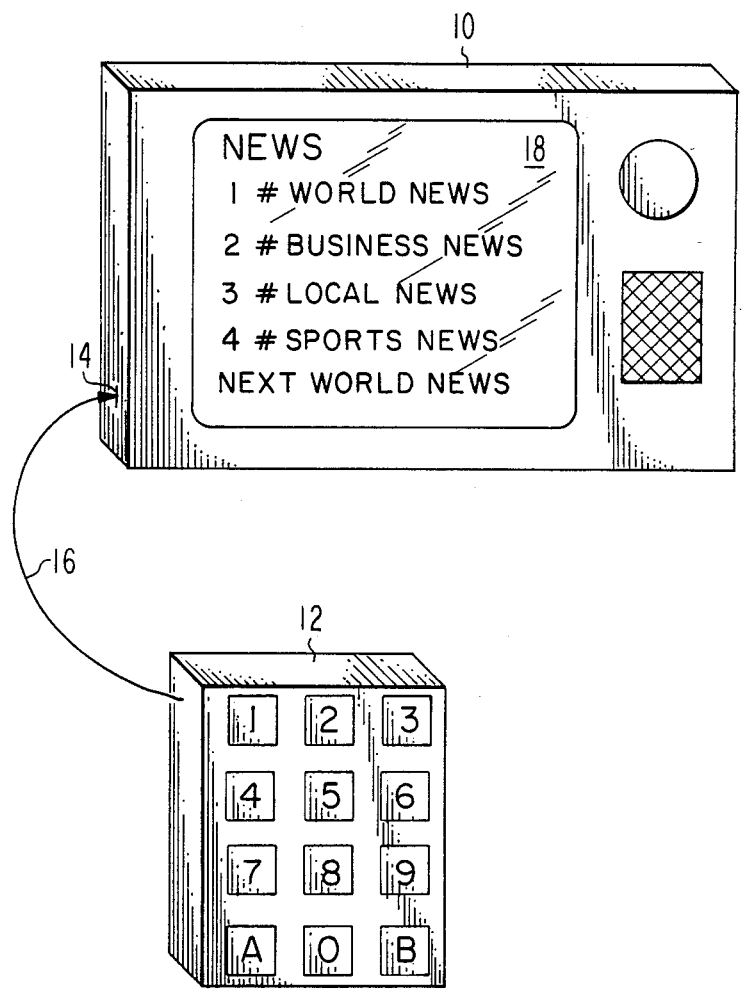
Figure 2:
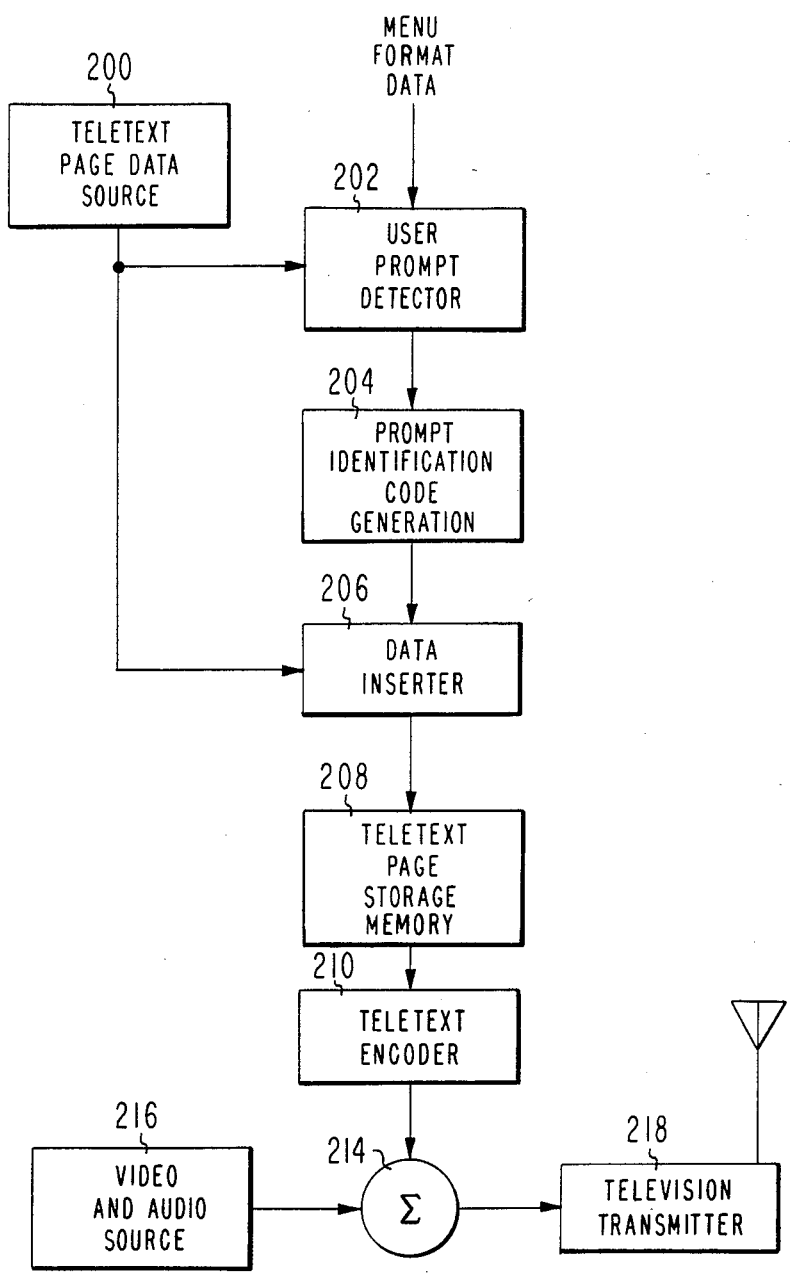
Figure 3:
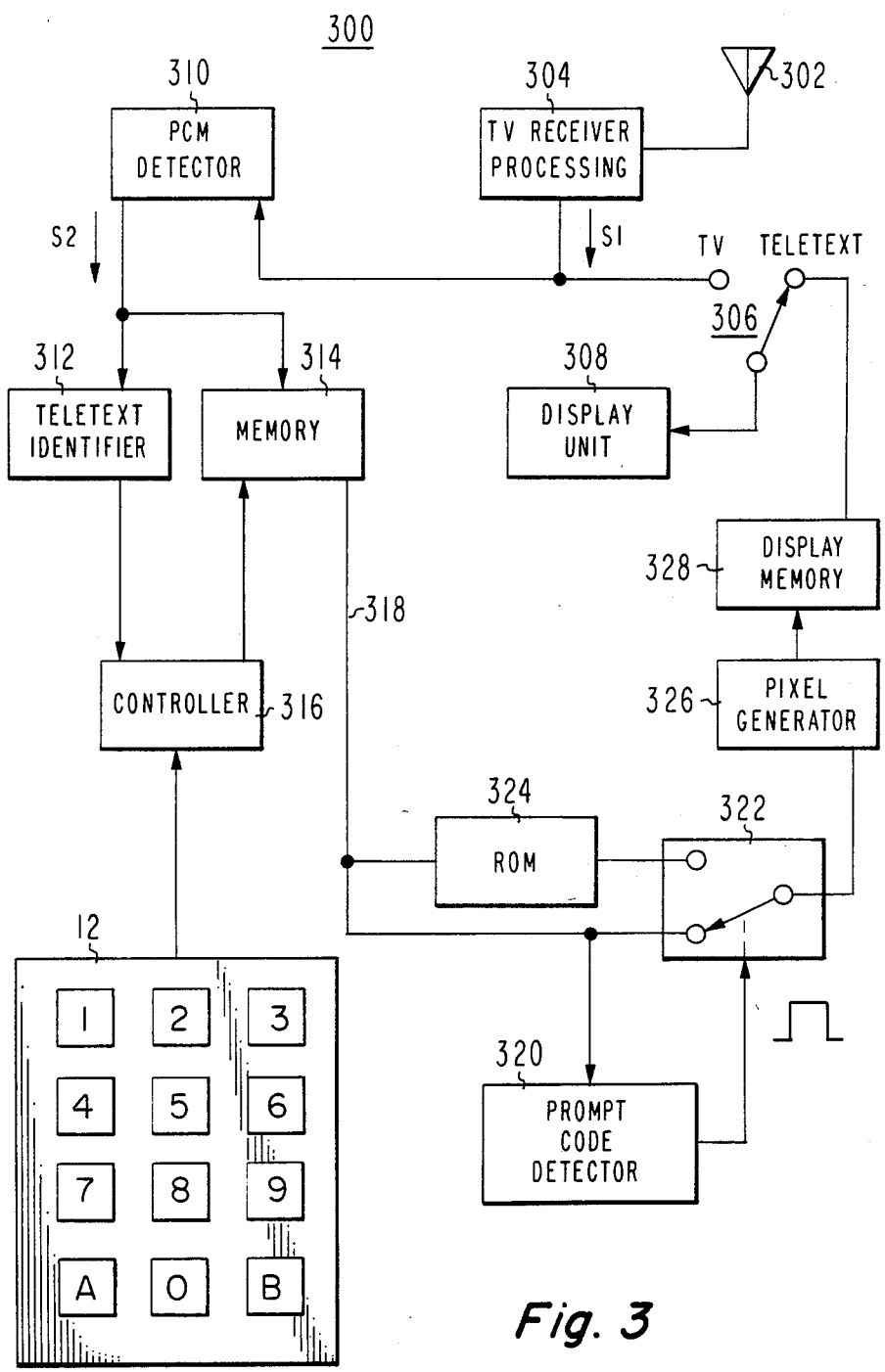

The foregoing and further features of the invention are described hereinafter and shown in the accompanying drawing wherein FIG. 1 is a block diagram of a teletext equipped illustrating a teletext equipped receiver;

FIG. 2 is a block diagram of a teletext encoding system embodying the method of the invention; and FIG. 3 is a block diagram of a teletext receiver apparatus embodying the invention.

FIG. 1 illustrates the nature of the problem solved by the present invention. The teletext system comprises a television receiver 10 having a teletext decoder therein (not shown) and a remote key pad 12 coupled to an input 14 of the teletext decoder in receiver 10 by means of a cable 16. The key pad has provision for 10 keys labeled 0 through 9 as shown. The receiver is assumed to be in its teletext receiving mode and is displaying an image on the video screen 18 of a news "menu". The menu comprises four items labeled 1 through 4. Behind each item on the menu is the prompting symbol signified by a lb. sign (#). For a user to access menu item 1 "world news" the user would be prompted by the 1#. symbol to enter the number 1 followed by the # on his keyboard unit 12. Unit 12, however, does not have a lb. symbol as a key identifier, only the number 1. It does however have two keys labeled a and b.

In making his selection the user might be inclined to press the symbols 1a or 1b on his remote control 12 in response to the prompt character 1# symbol. One possible solution to avoid the confusion as to what symbols to enter on the user keyboard would be for the manufacturer to provide a lookup table of symbol conversion characters which would identify which of the letters a and b correspond to the 1b. symbol. This, however requires that the user have such a table in his possession at the time he wishes to make his selection, or to simply guess as to the proper correspondence of the displayed prompt characters and the characters on his keyboard.

This problem is solved in accordance with the invention by transmitting with the prompt characters a nonvisible control character which identifies each prompt character or group of characters, in this case the symbols "1#". In the receiver the teletext decoder is arranged in such a manner as to detect the occurrence of the prompt symbol identifying character and then perform a symbol conversion prior to displaying the character so as to display characters which agree with the legends on the remote keyboard control unit 12. In this case upon occurrence of the nonvisible controlled character the symbols 1#, 2#, 3# and 4# would be converted for example to the symbols 1a, 2a, 3a and 4a.

FIG. 2 is a block diagram of a teletext encoding system for inserting the nonvisible prompt control character which identifies the user prompting symbols of the teletext data stream. The system comprises a teletext page data source 200 which may be a mass storage device or it may comprise a source of continuous information such as wire service stories, news flashes, etc. The output of data source 200 is applied to a user prompt detector unit 202 which receives a source of menu format data. Detector 202 compares the teletext data stream with the menu format data and identifies all teletext characters corresponding to user prompts. The output of detector 202 is applied to a prompt character code generator 204 which may include a read only memory (ROM) for generating a user prompt identification code word. The teletext data produced by source 200 is coupled by a data inserter 206 to a teletext page storage memory 208. Data inserter 206 receives the prompt identification code character produced in unit 202 whenever a prompt symbol occurs in the teletext data stream and inserts the control character either before or after the teletext prompt character.

The output of memory 208 is applied to a teletext encoder 210 which converts the binary data of the memory into serial pulse code modulated luminance signal variations which are coupled by conductor 212 to a first input of a signal summing circuit 214. A second input of the signal summing circuit 214 is coupled to the output of a video source 216 for receiving the television program source. The summing unit 214 includes timing circuit synchronized with the video source so as to insert the pulse code modulated teletext data in a selected line or lines of the vertical interval of the video source signal. The resultant signal appearing at the output of unit 214 is applied to a television transmitter 216 where it is amplified and broadcast.

Referring now to FIG. 3 the specially encoded teletext signal is received by antenna 302 coupled to the television receiver processing unit 304 of the users teletext receiver 300. Unit 304 includes conventional television receiving circuits for producing a television video output signal S1 which is normally coupled by a switch 306 to a display unit 308 during the normal "t.v." operating mode of the receiver. When in the teletext operating mode switch 306 is placed in the position to couple a teletext signal processed as will be described to display unit 308. The video signal S1 is applied to the input of a pulse code modulation (PCM) detector 310 which senses the luminance signal variations during the vertical interval representative of the teletext signal and produces a binary output signal S2 conveying the teletext information. Signal S2 is applied to a teletext identifier unit 312 and to a memory unit 314. Unit 312 receives timing signals from t.v. processing unit 304 for identifying the particular lines of the vertical interval where the teletext signal is encoded and identifies the teletext synchronizing code preamble. When a line of teletext code is identified unit 312 supplies a control signal to controller 316 which in turn supplies a write enable signal to memory 314 which stores the line (or lines) of teletext data. Control unit 316 also receives control signals from keyboard unit 12 for inputting user prompts into the teletext system as will be described. The data stored in unit 312 is built up line by line during the normal video transmissions such that memory 314 can store one or several pages of information. After a page of data to be displayed is built up in memory 314 controller 316 activates a memory read operation which sends the stored page of data via conductor 318 to a prompt code detector 320, to a first input of a switch 322 and to an address input of a read only memory (ROM) 324. The output of ROM 324 is applied to the second input of switch 322 which is controlled by an output of prompt code detector 320. In operation of this portion of the receiver detector 320 identifies each of the prompt code identifying symbols in the data stream on conductor 318.

When taken together prompt code detector 320, ROM 324 and switch 322 cooperate to provide prompt character symbol conversion as follows. When the data from memory 314 contains no prompt characters the output of detector 320 is low, thereby maintaining switch 322 in a position to couple the data on conductor 318 directly to the input of a pixel generator 326. Generator 326 takes the coded teletext information (characters or graphic symbols) and converts them and generates pixel intensity information therefrom. The output of generator 326 is stored in a display memory 328. Memory 328 may have a capacity for storing 210 lines each comprised of 256 pixels. In teletext operation the output of memory 328 is coupled via switch 326 to a display unit 308 and memory 328 is continuously read out at conventional t.v. line and field rates thereby displaying the page data stored in memory 314.

When the data on conductor 318 contains a prompt code identifying character, detector 320 produces an output pulse which changes switch 322 to its uppermost position for coupling the output of ROM 324 to the input of pixel generator 326. ROM 324 is addressed by the data on conductor 318 and contains a character translation table the output of which is signals representative of symbols available on keyboard unit 12. With reference to the example of FIG. 1, when the symbol 1# appears on conductor 318, the special prompt character identifying code preceding a number 1 will be detected by detector 320. Switch 322 will be changed over and the signals representative of symbols 1# which are applied sequentially to the address lines of ROM 324 will cause signals representative of the symbols 1a to appear at the output of the ROM so that the image displayed on display unit 308 will agree with the keyboard symbols available on unit 12 even though the actual received character indicative of a prompt situation is not available on unit 12. The switch control signal produced by prompt code detector 320 should be reasonably matched to the length to the number of characters which are to be converted by ROM 324. That is, if the prompt symbols are two characters long then the prompt code detector 320 should change over switch 322 for a length of time substantially equal to two characters, and so forth. This may be accomplished by incorporating into prompt code detector 32 a delay element such as a monostable flip-flop or a counter arranged for counting clock pulses for holding switch 322 in the "conversion" position for the appropriate length of time.

Pixel generator 326 therefore receives a stream of signals representative of non-prompting signals to be displayed interspersed with signals representing the prompting symbols to which conversion has been made. The prompting of the user therefore may be by means of symbols which correspond exactly to the designations of the keys available to the user for accomplishing the prompted function.

It will be appreciated that various changes and modifications may be made to the embodiments of the invention herein shown and described. For example, the remote control unit 12 may have more or fewer keys than those shown and may be coupled sonically or by infra red or by other means to controller 316. It will also be appreciated that the translation provided by ROM 324 of the number of characters in the prompt sequence need not be on a one-for-one basis. That is to say a three character prompt sequence may be foreshortened to one or two characters or in the alternative a shorter prompt sequence may be lengthened to more characters or to special graphic symbols if desired. It will also be appreciated that the storage and character generation of the signals produced at the output of switch 322 may be of different form. For example the position of pixel generator 326 and display memory 328 may be reversed that is the converted teletext data may be first stored in the display memory and then converted to pixel form by generator 326. The teletext information may occupy a complete television channel to the exclusion of a host television signal, which in FIG. 2 would be represented by deletion of summing circuit 214 and video source 216.

What is claimed is:

1. A teletext receiver for receiving teletext signals and for allowing ready use of a remote control having arbitrarily designated symbol keys, comprising:
   teletext signal receiving means for receiving coded teletext signals;
   first memory means coupled to said teletext signal receiving means for storing in coded form signals representative of prompting and non-prompting symbols to be displayed;
   detector means coupled to said first memory means for generating a control signal that is indicative of the presence of a prompting signal to be displayed;
   controllable code conversion means coupled to said detector means for converting said coded signals representative of prompting symbols to be displayed into coded signals representative of other symbols under the control of said control signal and for passing unchanged those coded signals representative of non-prompting symbols, said other symbols being symbols identifying the symbol keys of the remote control with which the receiver is associated;
   coded-symbol-to-pixel conversion means coupled to said controllable code conversion means for receiving said coded signals to be displayed and for generating pixel intensity information therefrom;
   second memory means coupled to said coded-symbol-to-pixel conversion means for storing said pixel intensity information; and
   display means coupled to said second memory means for displaying said non-prompting symbols and said converted prompting symbols corresponding with said other symbols identifying said symbol keys of said remote control.

2. A receiver according to claim 1 wherein said detector means detects a prompt signal identifying prefix.

3. A receiver according to claim 1 wherein said controllable code conversion means comprises a preprogrammed ROM.

4. A receiver according to claim 3 wherein said controllable code conversion means further comprises controllable switch means for selecting between ROM input data and ROM output data.

5. A teletext receiver for receiving teletext signals and for allowing ready use of a remote control having arbitrarily designated symbol keys, comprising:
   teletext receiving means responsive to a video signal supplied thereto having a teletext signal component for providing a teletext data output signal;
   first memory means for storing said teletext data, the stored data being representative of prompting symbols and non-prompting symbols to be displayed, said stored prompting symbol data including a prompting symbol identification code;
   detector means responsive to the stored data recovered upon a read operation of said first memory means for producing a control signal upon the occurrence of each prompting symbol identification code;
   controllable code conversion means responsive to the recovered data and to said control signal for converting the recovered data representative of prompting symbols to be displayed into coded data representative of symbols present on selected ones of said symbol keys and for passing unchanged those recovered data representative of non-prompting symbols;
   pixel converter means responsive to the converted and unchanged data produced by said code conversion means for generating pixel information; and
   means associated with said pixel converter means for providing storage and display of said pixel information whereby non-prompting symbols are displayed without alteration and prompting symbols are displayed so as to conform to symbols on said symbol keys.

* * * * *